Jan. 7, 1969 L. E. HERSHEY 3,420,535

FLOATING FACE SEALING RING

Filed Jan. 12, 1966

INVENTOR.
LOWELL E. HERSHEY
BY
*Markham, Blanchard & Flynn*
ATTORNEYS

United States Patent Office 3,420,535
Patented Jan. 7, 1969

3,420,535
FLOATING FACE SEALING RING
Lowell E. Hershey, Portage, Mich., assignor to Durametallic Corporation, Kalamazoo, Mich., a corporation of Michigan
Filed Jan. 12, 1966, Ser. No. 521,761
U.S. Cl. 277—92         6 Claims
Int. Cl. F16j 15/38

ABSTRACT OF THE DISCLOSURE

A mechanical seal construction wherein a seal ring and a face ring have a thin, flat gasket therebetween having a thickness of between .001 and .025 inch. The unit pressure applied to the gasket is substantially higher than the unit pressure applied against the seal face of the face ring.

---

This invention relates to an improved mechanical seal construction and, more particularly, relates to a mechanical seal construction employing a seal ring and a separate face ring which are connected together by improved means comprising a thin, flat gasket made of a flexible, flowable and chemically inert material.

It has been customary for many years in certain types of mechanical seal constructions to provide one of the seal faces of the mechanical seal with a so-called "face ring" which is made of a wear-resistant material and which is separate from, but attached to, its associated seal ring. An important reason for using this type of construction is that the seal ring itself can be made of a less expensive and durable material and, thus, the cost of the seal can be reduced without reducing the effectiveness or durability of the seal. Also, the face ring can be replaced when it becomes worn without replacing the seal ring. In many cases, a resilient washer has been positioned between the face ring and the seal ring, and has been secured to both rings by a suitable adhesive or mechanical clamping means. The procedures for making such mechanical seals are relatively complex and expensive. In particular, it has been necessary to perform the required finish lapping operation on the face ring after it has been assembled with the seal ring and this is relatively difficult to do and often results in a surface that does not maintain flatness during storage and operation. Moreover, such constructions are not sufficiently durable because the face ring can become loosened or leak under a variety of temperature and pressure conditions too easily. Thus, the prior mechanical seals employing a face ring mounted on a seal ring have not been completely satisfactory and there has long existed a need for an improved mechanical seal construction provided with improved means for connecting the face ring to the seal ring.

Accordingly, it is an object of this invention to provide an improved mechanical seal construction employing a face ring and a sealing ring, in which the face ring can be connected to the seal ring by a simple and inexpensive procedure.

It is a further object of this invention to provide an improved mechanical seal construction, as aforesaid, in which many of the assembly steps and expensive finishing operations required with prior mechanical seal constructions of this type are unnecessary.

It is the further object of this invention to provide an improved mechanical seal construction, as aforesaid, in which the face ring is connected to the seal ring by means of a gasket which is bonded to both the seal ring and the face ring by a simple pressing operation.

It is a further object of this invention to provide an improved mechanical seal construction, as aforesaid, in which the gasket is protected from the application thereon of forces which would tend to move the gasket with respect to the face ring and the seal ring whereby the durability of the mechanical seal construction is significantly increased.

Additional objects and advantages of the invention will become apparent to persons acquainted with equipment of this type upon reading the following description and inspecting the accompanying drawings, in which.

General description

Figure 1:
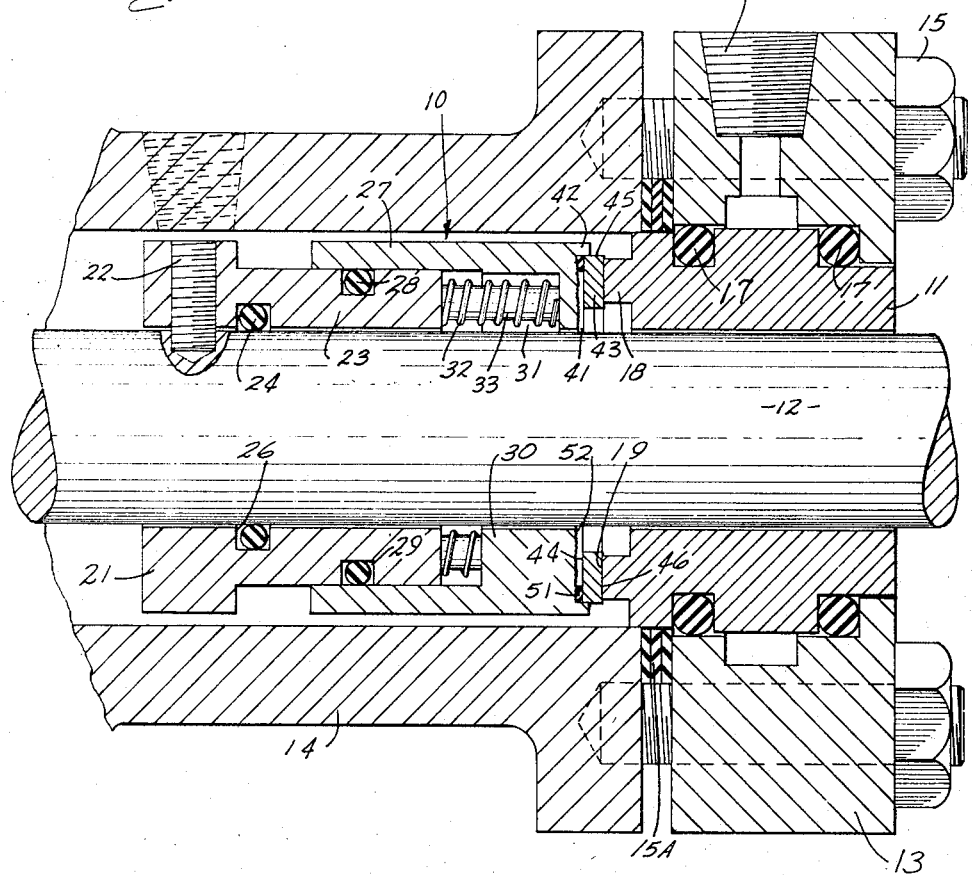
FIGURE 1 is a central sectional view of a preferred embodiment of the improved mechanical seal construction to which the invention relates, shown in association with a rotatable shaft and a stationary housing.
Figure 3:
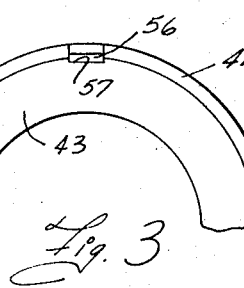
FIGURE 3 is a sectional view taken along the line III—III of FIGURE 2.
Figure 2:
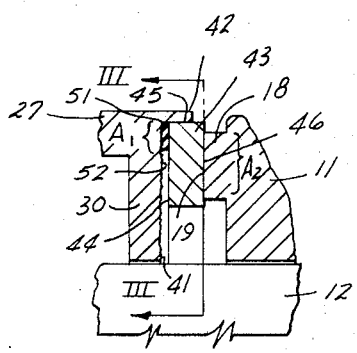
FIGURE 2 is a view, on an enlarged scale, of a fragment of the structure illustrated in FIGURE 1.

The invention relates to a mechanical seal construction for sealing a rotatable shaft with respect to stationary wall means, such as a pump housing. The mechanical seal construction comprises a pair of annular elements surrounding the shaft and having opposed seal faces extending at right angles to the shaft. One of the annular elements is secured to the stationary wall means and the other element is mounted for rotation with the shaft. Means are provided for urging the seal faces into sealing and sliding engagement with each other. One of the elements comprises a seal ring and face ring assembly in which an annular gasket is disposed between and bonded to both the seal ring and the face ring whereby said rings are fixedly secured to each other. The face ring has a surface forming one of the afore-mentioned seal faces. The gasket is a thin, flat, annular member made of a material which is flexible, flowable and chemically inert. By "chemically inert," it is meant that the gasket is made of a material which is substantially nonreactive with the particular pressure fluid being sealed.

Detailed description

Referring to the drawing, there is shown, by way of example, a mechanical seal 10 of the "inside" type, that is, a mechanical seal in which the rotating part of the seal is inside of the housing which contains the fluid under pressure. The mechanical seal 10 comprises a stationary annular element 11 which surrounds a shaft 12. In the illustrated embodiment of the invention, the annular element 11 is a gland insert which is mounted within a gland 13. The gland 13 is secured to a housing 14 by bolts 15 and suitable sealing means 15A, such as gaskets, are provided between the gland 13 and the housing 14. The gland 13 has an opening 16 for supplying coolant to the external surface of the gland insert 11. A further opening (not shown) is provided in the gland 13, in a conventional fashion, to permit the cooling fluid to exit from the gland. A pair of axially spaced O-rings 17 are provided for preventing the flow of coolant in both axial directions along the outer side of the gland insert 11. The gland insert 11 has a portion which projects into the housing 14 and the inner end of such gland insert has an annular axial projection 18 which is provided with an accurately finished radial seal surface 19. The annular element 11 can be made of any suitable material, such as carbon.

A collar 21 encircles, and is fixedly secured to, the shaft 12 by suitable means, such as one or more set screws 22. The collar 21 has an annular portion 23 projecting axially toward the annular element 11. An O-ring 24 is disposed within a groove 26 in the internal surface of the annular portion 23 and sealingly engages the shaft 12.

An annular seal ring 27 is closely slideably telescoped on the annular portion 23 and is movable axially with respect to the shaft 12. An O-ring 28 is disposed within a groove 29 in the external surface of the annular portion 23 and sealingly contacts the seal ring 27.

The seal ring 27 has a radially inwardly extending enlargement 30 which extends into the space between the collar 21 and the annular element 11. The enlargement 30 has a plurality of axially extending, circumferentially spaced recesses 31 therein, only one of which is shown. Drive pins 33 are fixedly secured at one end thereof to the collar 21 and extend into the recesses 31 whereby the seal ring 27 is forced to rotate with the shaft 12 and the collar 21. Coil springs 32 in the illustrated embodiment surround the drive pins 33 and corresponding ends of said springs are bottomed in the recesses 31. The other ends of the springs 32 engage the collar 21 and said springs are under compression so that the seal ring 27 is continuously urged toward the annular element 11. In other instances the said springs are arranged between the seal ring and the collar independently of the pins but held similarly under compression.

It will be recognized that the mechanical seal construction 10, as thus far described, is of a conventional, well-known type. The foregoing description of the mechanical seal construction 10 is given for illustrative purposes only and has no limiting significance. It will be understood that the structure of the invention described hereinbelow can be applied to a wide variety of other specific mechanical seal constructions.

Considering now the improvements to which the present invention relates, the enlargement 30 has an annular recess 41 formed in the end thereof which faces the annular element 11. The enlargement 30 has an axially extending, generally annular projection 42 surrounding and forming the side wall of the recess 41. A face ring 43 is received, at least in part, within said recess 41. The peripheral wall 45 of the face ring 43 fits snugly within the recess and has a close sliding fit with the internal surface of the projection 42.

The face ring 43 has radially extending end surfaces 44 and 46. Surface 46 provides a rotatable seal face which is adapted to slideably and sealingly contact the stationary seal face 19 over an annular area of substantial extent as described in greater detail hereinbelow. Because of the urging of the springs 32 and in view of the complementary shape of the seal faces 19 and 46, an effective seal is maintained as the seal ring 27 rotates with respect to the annular element 11.

The face ring 43 can be made of any suitable wear resistant material, such a tungsten carbide or carbon. It will be understood by persons acquainted with equipment of this type that the annular member 11 and the face ring 43 can be made of a wide variety of different materials, depending particularly on the type of fluid to be sealed and the pressure under which said fluid operates.

A gasket 51 is positioned between the surface 44 of the face ring 43 and the bottom wall 52 of the recess 41 and is bonded thereto as described further hereinbelow. The gasket 51 is a thin, flat ring whose opposite sides are substantially parallel with the surface 44 and the bottom wall 52. It will be noted that the external diameter of the gasket 51 is substantially equal to the external diameter of the face ring 43 while the internal diameter of said gasket 51 is appreciably greater than the internal diameter of the face ring 43. Thus, the inner edge of the gasket 51 is located a substantial distance radially outwardly of the inner edge of the ring 43. The radial width of the gasket 51 is such that the area $A_1$ of contact between the gasket 51 and the surface 44 and the bottom wall 52 is appreciably less than the area $A_2$ of contact of the seal faces 19 and 46. It has been found particularly effective to make the area $A_1$ less than about two-thirds the size of the area $A_2$, preferably from one-third to two-thirds the size of the area $A_2$.

Area $A_1$ is made of smaller size than the area $A_2$ because the pressure fluid within the housing 14 surrounding the seal ring 27 tends to enter between the seal faces 19 and 46 and also tends to enter between the gasket 51 and the surface 44 of the face ring 43 or the surface 52. This pressure exerts a force, called an opening force, which tends to separate the sealing faces 19 and 46 from each other and also tends to separate the gasket 51 from the surface 44 of the face ring 43 and/or the surface 52. By making the area $A_1$ of less size than the area $A_2$ there is a higher unit pressure loading between the gasket 51 and the face ring 43 than there is between the seal faces 19 and 46 so that the pressure fluid exerting the opening force can more easily enter between said seal faces than between said gaskets and said face ring. Hence, this feature of the invention materially diminishes the likelihood of the gasket 51 being blown out of place or leaking the sealed fluid.

A lug 56 is lanced out of the annular projection 42 and it extends into a notch 57 in the face ring 43 in order to secure the face ring 43 against relative rotation with respect to the seal ring 27 and thereby provides further assurance that the gasket 51 will be maintained in place in the recess 41.

The thickness of the gasket 51 is between about .001 and about .025 inch. The minimum thickness is determined by what is practical to cut and fit because these thin gaskets are flimsy and wrinkle easily. From a handling and manufacturing standpoint a gasket of .005 to .010 inch in thickness is preferred. If the gasket is of greater thickness than indicated above, it is more apt to be blown out of the recess 41 by any fluid pressure which becomes present between the face ring 43 and the bottom wall 52 of the recess 51. Moreover, when the mechanical seal is used to seal a heated fluid, the gasket 51 can become flowable and the sealing pressure can cause it to extrude whereby the radial width of said gasket becomes too large for effective operation. That is, if the gasket 51 is made thicker than about .025 inch and the seal is used in conjunction with a heated fluid, said gasket might expand radially inwardly so that the area $A_1$ becomes equal to or larger than the area $A_2$ whereby the danger of said gasket being blown out of place and leaking would become very great.

The gasket 51 can be made of a variety of materials provided that same are flexible, flowable and chemically inert to the fluid being sealed. It has been found especially satisfactory to make the gasket of polytetrafluoroethylene, although gaskets made of other material, such as pyrolytic graphite, have been found satisfactory for many uses.

An advantage of the present invention is that it is not necessary to precisely finish the recess 41, particularly the bottom wall 52 thereof. That is, the recess 41 can be formed by the usual machining operation and the microfinishing operations, heretofore usually required for installing face rings, are not required with the construction according to the present invention. It has been found that the gasket 51 will form an effective seal with the seal ring 27 and the face ring 43, as described further hereinbelow, if the bottom wall 52 of the recess has a surface roughness of between about 32 to 250 microinches. Surface roughnesses within the above-indicated range can be achieved by many common machining methods, such as drilling boring and milling operations, so that the seal ring 27 can be formed by such operations without requiring any further microfinishing steps.

A further important advantage of the invention is that the face ring 43 can be finish lapped before said face ring is assembled with the seal ring 27, instead of being finish lapped afterwards, as is customary with prior seal ring, face ring assemblies. It is well known that the sealing faces of a mechanical seal, such as the seal faces 19 and 46 of the illustrated embodiment of the invention, must be precision lapped so that they are flat within three light bands and have a surface roughness of less than about 5 microinches. It is quite difficult and expensive to precision lap the seal face of a face ring after it has been installed on the seal ring. However, because the face ring 43 itself is flat, it is relatively easy to perform the finish lapping operation on the face 46 thereof prior to its installation on the seal ring 27 and the subsequent assembly procedures can be carried out so as not to destroy this flatness.

*Assembly and operation*

The seal ring 27 is formed by the usual machining operations, without necessarily performing microfinishing operations thereon for the reasons previously discussed. The gasket 51 is then placed in the recess 41. Then the face ring 43, which has already been finish lapped, is placed in the recess 41 on top of the gasket 51. The face ring 43 is then pressed against the gasket 51 under a high pressure to seal the parts together. If desired, heat can be applied during the pressure application step but such is not necessary. It should be noted here that it is not necessary to use any adhesive or other type of bonding material during the assembly operation. Because of the high pressure imposed thereon, the gasket 51 flows to a limited extent so that it conforms substantially to any irregularities on the surface of the bottom wall 52 of the recess and the surface 44 of the seal ring and becomes bonded thereto. While the exact nature of the bond between the gasket, on the one hand, and the face ring 43 and the seal ring 27, on the other hand, has not been definitely established, it is believed that the bonding is due in part to a mechanical interlock between the parts and in part to a vacuum condition created when air is forced out from between said gasket and said seal ring and said face ring. It will be understood, however, that the invention is not limited to the correctness of the foregoing suggestions as perhaps other phenomena may be present which cause the bonding. It should suffice to say that the use of the high pressure creates between said gasket and said seal ring and said face ring a tenacious bond whereby these parts function as a unit. This bond is subject to disruption, particularly by the flow of pressurized fluid between the gasket and the face ring, but such is minimized by making the relative area of the bond of appreciably less size than the area of contact between the seal faces as described above.

The pressure applied to press the face ring 43 against the gasket 51 must be sufficiently great as to cause flow of the gasket material and to assure an intimate contact between said gasket and said seal ring and said face ring. Ordinarily, a pressure of about 10,000 pounds per square inch is adequate to insure proper bonding of said gasket to said seal ring and said face ring.

Before the bonding of the face ring is effected, the lug 56 is bent inwardly into the notch 57 in order to secure the face ring 43 and the seal ring 27 against relative rotation.

The installation and operation of the mechanical seal assembly on the shaft and housing can be in accordance with conventional practice and, hence, needs no further detailing.

Thus, the invention provides an improved mechanical seal construction in which the face ring can be connected to the seal ring by a simple pressing operation which can be carried out easily and inexpensively. No special assembly techniques are required, yet the seal ring and face ring are firmly united to each other so that they will function effectively for a long period of time.

While a particular preferred embodiment of the invention has been described, the invention contemplates such changes and modifications therein as lie within the scope of the appended claims.

The embodiments of the invention in which an exclusive property or privilege is claimed are defined as follows:

1. A mechanical seal construction for sealing a rotatable shaft with respect to a stationary wall, comprising:
   first and second annular elements surrounding said shaft and having opposed transverse seal faces, one of said elements being secured to said wall and the other element being mounted for rotation with said shaft, and means for urging said seal faces into sealing and sliding engagement with each other;
   one of said annular elements comprising a seal ring, a face ring and an annular gasket disposed between opposed surfaces of said face ring and said seal ring in pressed-together relationship therewith, one of said opposed surfaces of said seal ring and face ring having a surface roughness of between 32 and 250 microinches thereon to assist in holding said gasket between said opposed surfaces for preventing gasket blow-out, said face ring having a further surface forming one of said seal faces;
   said gasket being a thin, flat annular member made of a material which is flexible, flowable and chemically inert, the area of contact of said gasket with said face ring being between about one-third and two-thirds of the area of contact of said seal faces whereby the unit pressure loading on said gasket is substantially larger than the unit pressure loading on said seal faces, and the thickness of said gasket being between about .001 inch and .025 inch.

2. A mechanical seal construction according to claim 1, in which the gasket thickness is between about .005 and .010 inch.

3. A mechanical seal construction according to claim 2, in which the gasket preferably has an area of contact with said face ring of approximately one third of the area of contact of said seal faces.

4. A mechanical seal construction according to claim 2, in which said seal ring has a lug which projects into a notch on said face ring to prevent relative rotation between said seal ring and said face ring.

5. A mechanical seal construction according to claim 2, in which the gasket is made of a material selected from the group consisting of polytetrafluoroethylene and pyrolytic graphite.

6. A mechanical seal construction according to claim 2, in which said seal ring has an annular recess therein and an axially projecting annular outer wall portion, the external diameter of said face ring being substantially equal to the internal diameter of said outer wall portion, said face ring being disposed within said recess with the outer edge of said face ring being in snug contact with the internal surface of said outer wall portion, said gasket being disposed entirely between the bottom wall of said recess and the opposed surface of said face ring.

References Cited

UNITED STATES PATENTS

| | | | |
|---|---|---|---|
| 2,296,724 | 9/1942 | McCormack | 277—92 X |
| 2,744,774 | 5/1956 | Wist | 277—96 X |
| 2,797,940 | 7/1957 | Michener et al. | 277—91 |
| 2,951,719 | 9/1960 | Porges | 277—91 X |
| 3,330,565 | 7/1967 | Lymer | 277—91 |

FOREIGN PATENTS 766,390   1/1957   Great Britain.

SAMUEL ROTHBERG, *Primary Examiner.*

J. S. MEDNICK, *Assistant Examiner.*

U.S. Cl. X.R.

277—27, 91, 93